United States Patent
Lee et al.

(10) Patent No.: US 7,773,633 B2
(45) Date of Patent: Aug. 10, 2010

(54) APPARATUS AND METHOD OF PROCESSING BITSTREAM OF EMBEDDED CODEC WHICH IS RECEIVED IN UNITS OF PACKETS

(75) Inventors: Mi Suk Lee, Daejeon (KR); Dae Ho Kim, Daejeon (KR); Do Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 888 days.

(21) Appl. No.: 11/635,512

(22) Filed: Dec. 8, 2006

(65) Prior Publication Data
US 2007/0133619 A1 Jun. 14, 2007

(30) Foreign Application Priority Data
Dec. 8, 2005 (KR) ............ 10-2005-0119277
Aug. 21, 2006 (KR) ............ 10-2006-0078797

(51) Int. Cl.
*H04J 3/00* (2006.01)
(52) U.S. Cl. .............. 370/476; 370/252; 370/352; 370/356; 370/516
(58) Field of Classification Search .......... 370/476, 370/252, 352, 356, 516
See application file for complete search history.

(56) References Cited

U.S. PATENT DOCUMENTS 6,434,606 B1    8/2002  Borella et al.
2005/0226227 A1*  10/2005  Kim et al. .............. 370/352
2006/0088093 A1*  4/2006   Lakaniemi et al. ..... 375/240.01
2008/0052068 A1*  2/2008   Aguilar et al. ............ 704/230
2008/0159384 A1*  7/2008   Civanlar et al. ........ 375/240.01

OTHER PUBLICATIONS

Toshiyuki Nomura et al., A Bitrate and Bandwidth Scalable Celp Coder, IEEE, 1998, pp. 341-344.

* cited by examiner

*Primary Examiner*—Ricky Ngo
*Assistant Examiner*—Luat Phung
(74) *Attorney, Agent, or Firm*—Lowe Hauptman Ham & Berner LLP

(57) ABSTRACT

Provided are a packet processing apparatus and method used when an output bitstream of an embedded codec is divided into a plurality of packets and transmitted accordingly, and more particularly, an efficient packet processing apparatus and method which can reduce deterioration of sound quality which may occur when a packet required for the reproduction of a voice signal is not received due to different arrival times of a plurality of packets at a receiving end if an output bitstream of an embedded codec is divided into the packets and transmitted accordingly through a path or a plurality of paths. In particular, an apparatus for processing packets of an embedded codec is provided. The apparatus includes a packet reception unit receiving packets, a layer information unit identifying layer information from received packets, a bitstream determination unit using the received packets, and a bitstream generation unit generating a new bitstream. The apparatus is used to provide a voice and multimedia service using an embedded codec in a packet network.

13 Claims, 6 Drawing Sheets

APPARATUS AND METHOD OF PROCESSING BITSTREAM OF EMBEDDED CODEC WHICH IS RECEIVED IN UNITS OF PACKETS

This application claims the priority of Korean Patent Application No. 10-2005-0119277, filed on Dec. 8, 2005, and Korean Patent Application No. 10-2006-0078797, filed on Aug. 21, 2006, in the Korean Intellectual Property Office, the disclosures of which are incorporated herein in their entirety by reference.

BACKGROUND OF THE INVENTION

1. Field of the Invention

The present invention relates to an apparatus and method of processing a bitstream of an embedded codec, and more particularly, to a packet processing apparatus and method which can reduce deterioration of sound quality caused by different arrival times of a plurality of packets at a receiving end when an output bitstream of an embedded codec is divided into the packets and transmitted accordingly.

2. Description of the Related Art

As services and network bandwidths become various, embedded codecs have actively been studied. Embedded codecs can provide voice and audio services of various qualities by supporting various bit rates using bitstreams which are formed in an embedded manner. The embedded codecs can process all of narrowband (300-3400 Hz), broadband (50-7000 Hz) and audio band (20-20000 Hz) signals. In other words, since a bitstream is formed in an embedded manner, the bandwidth and quality of a reproduced signal can vary according to how much of an encoded bitstream is extracted and decoded.

Generally, conventional voice codecs provide fixed bandwidths and bit rates. Therefore, the conventional voice codecs may be classified into narrowband codecs and broadband codecs according to bandwidths of signals processed. Adaptive MultiRate-Narrowband (AMR-NB) and Adaptive MultiRate-WideBand, which have been adopted as standards of the Third Generation Partnership Project (3GPP), provide various source qualities using diverse bit rates. However, according to these standards, a bitstream is not formed in an embedded manner. Instead, an independent bitstream is formed for each bit rate. Hence, if a bit rate changes, the operation of an encoder has to be changed. In other words, it is like having an independent encoder and decoder for each bit rate.

Q9 and Q10 of work package (WP) 3/study group (SG) 16 of the International Telecommunications Union-Telecommunication Standardization Sector (ITU-T) are currently standardizing embedded codecs. Specifically, Q10 is standardizing an embedded broadband codec which provides bitstream-level interoperability with G.729, which is a conventional narrowcodec widely used in an Internet phone (VoIP) service. In addition, Q9 is standardizing an embedded codec whose packet loss compensation rather than interoperability with a conventional codec is excellent.

SUMMARY OF THE INVENTION

It is an objective of the present invention to provide a packet processing apparatus and method which can minimize the deterioration of sound quality by determining the position of each packet in an output bitstream of an embedded codec if the output bitstream that is to be decoded has been divided into a plurality of packets and transmitted accordingly, generating a new bitsteam using packets received before a decoding operation has to be performed if not all packets have been received, and transmitting the new bitstream to a decoder so that a voice signal can be reproduced using the received packets even when not all packets have been received.

It is another objective of the present invention to provide a function of adjusting the size of an adaptive jitter buffer based on a delay of a packet of a core layer if a bitstream of an embedded codec is divided into a plurality of packets and transmitted accordingly.

According to an aspect of the present invention, there is provided an apparatus for processing a bitstream of an embedded codec, which is received in units of packets. The apparatus includes a packet reception unit receiving the bitstream of the embedded codec, which comprises a plurality of layers, in units of packets including the layers; a layer information unit identifying layer information from received packets; a bitstream determination unit assembling bitstreams of the received packets based on the identified layer information and forming the bitstream as it was initially transmitted; a bitstream generation unit, if the packet reception unit has not received a packet including a layer, assembling received packets of layers, which are lower than the layer corresponding to the unreceived packet based on the identified layer information and generating a new bitstream; and a decoder decoding the bitstream formed or generated by the bitstream determination unit or the bitstream generation unit.

According to another aspect of the present invention, there is provided a method of processing a bitstream of an embedded codec, which is received in units of packets. The method includes receiving the bitstream of the embedded codec, which comprises a plurality of layers, in units of packets including the layers; identifying layer information from received packets; assembling bitstreams of the received packets based on the identified layer information and forming the bitstream as it was initially transmitted; if a packet including a layer has not been received, assembling received packets of layers, which are lower than the layer corresponding to the unreceived packet based on the identified layer information and generating a new bitstream; and decoding the bitstream formed or generated in the assembling of the bitstreams of the received packets and the forming of the bitstream or in the assembling of the received packets of the layers and the generating of the new bitstream.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
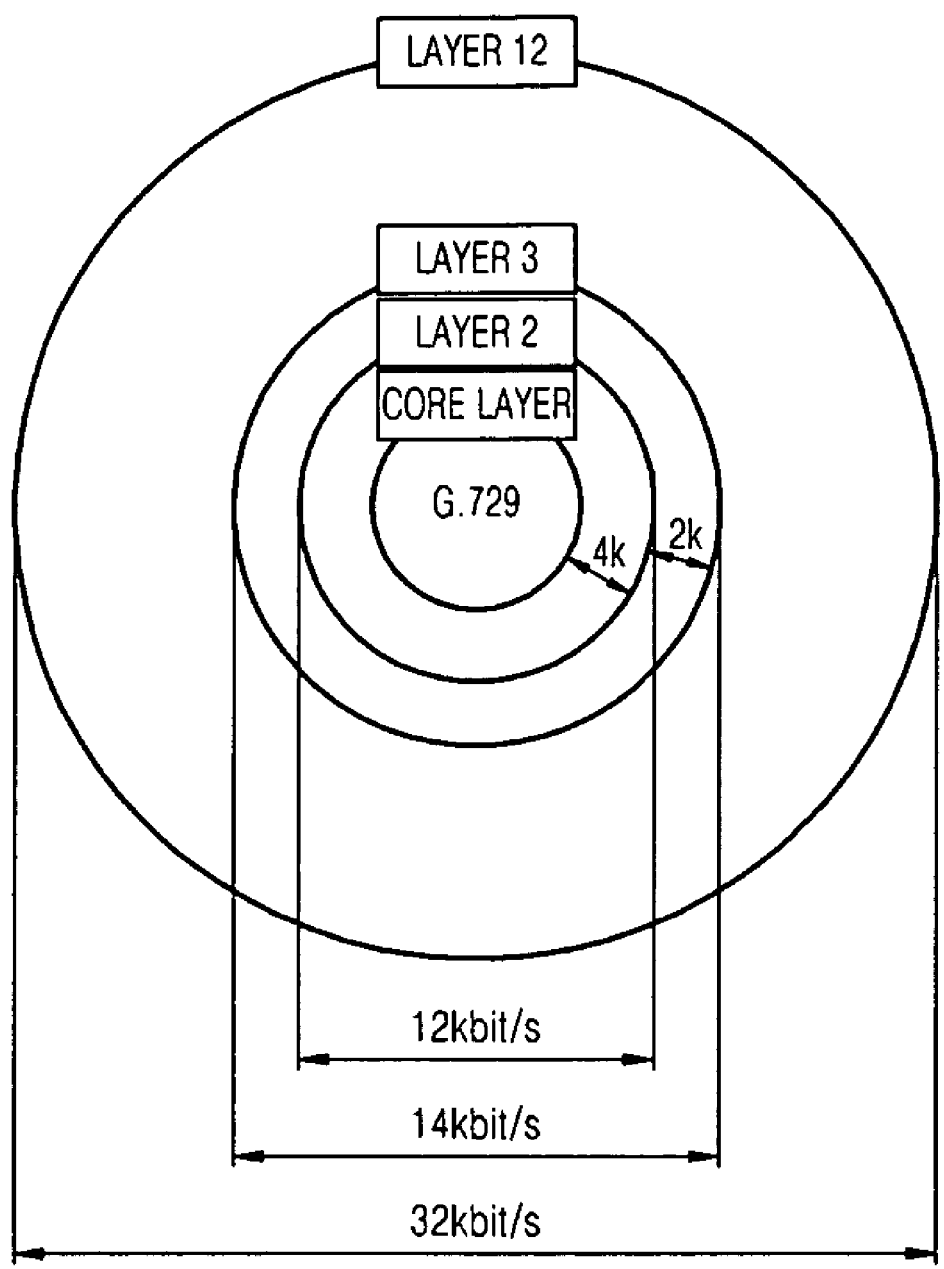
FIG. 1 illustrates the hierarchical structure of an embedded codec according to an embodiment of the present invention.

FIG. 1 illustrates the hierarchical structure of an embedded codec according to an embodiment of the present invention.

A codec is a compound word of a coder and a decoder. The codec compresses and reproduces voice or video data which is converted into a digital signal. For example, the codec compresses a large file, such as a moving-image file, and reproduces the file as it was. Compressing data into small data is called "encoding," and reproducing the original data from the small data is called "decoding."

Referring to FIG. 1, an example of an embedded codec being standardized by Q10 is illustrated. The embedded codec includes a conventional G.729 narrowband codec as a core layer and has a structure in which an increase in the number of layers results in an increase in a bit rate, which, in turn, enhances quality and widens bandwidth. Due to this hierarchical structure, as the number of layers increases, better sound quality can be provided. Accordingly, a broadband Voice over Internet Protocol (VoIP) service provided by the embedded codec can cover subscribers who use the conventional G.729 narrowband codec.

Figure 2:
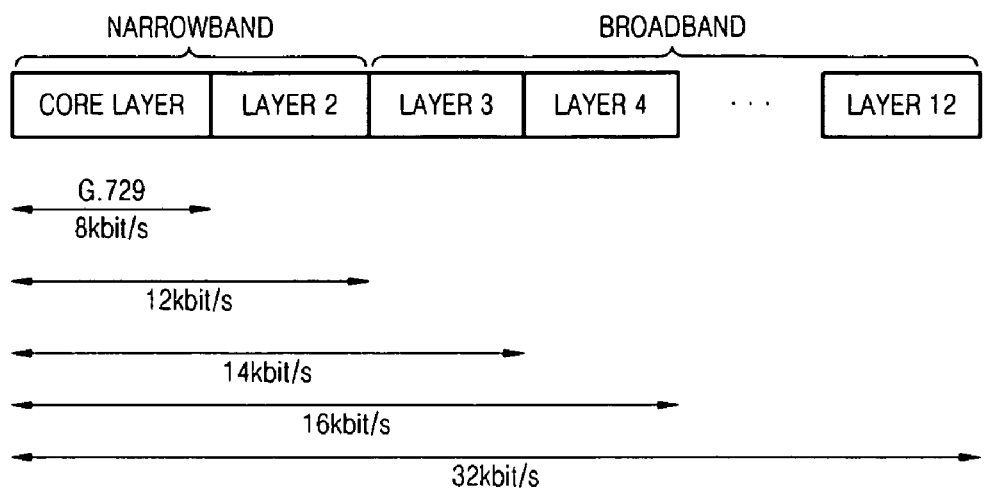
FIG. 2 illustrates the relationship between a layer and a bit rate of an embedded codec according to an embodiment of the present invention.

FIG. 2 illustrates the relationship between a layer and a bit rate of an embedded codec according to an embodiment of the present invention.

Referring to FIG. 2, a bitstream structure of the embedded codec is illustrated. Since a bitstream of the embedded codec is formed in an embedded manner, a service can also be provided to subscribers, who use a conventional codec, through the core layer. In addition, the bit stream may be adjusted according to the type of a subscriber terminal, a network condition, or the type of a service selected by a subscriber. Consequently, voice services of various qualities can be provided using various bit rates.

Figure 3:
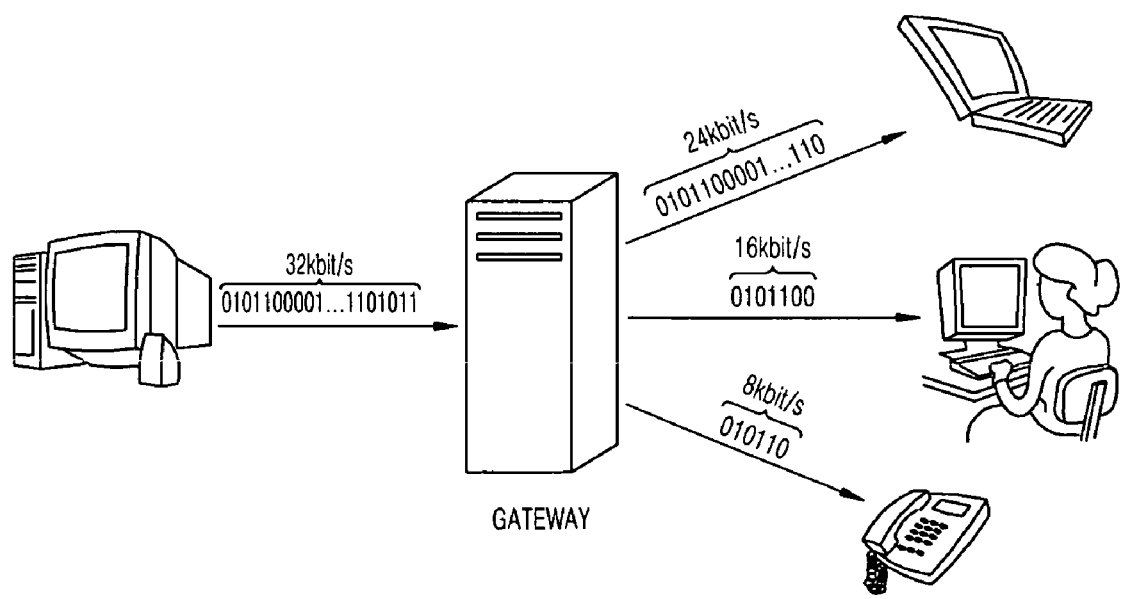
FIG. 3 illustrates bitstream transmission of an embedded codec and applications of the bitstream transmission in real life according to an embodiment of the present invention.

FIG. 3 illustrates bitstream transmission of an embedded codec and applications of the bitstream transmission in real life according to an embodiment of the present invention.

Referring to FIG. 3, after encoded at the highest bit rate that can be provided by an embedded codec, a voice signal may be transmitted to a receiving end using a different bit rate according to the state of the receiving end.

Figure 4:
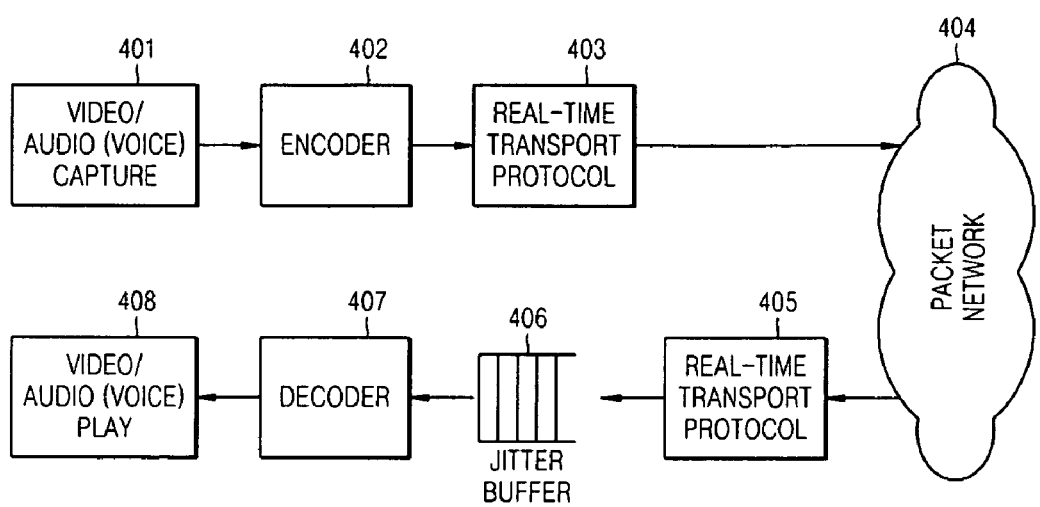
FIG. 4 illustrates voice packet transmission through a packet network according to an embodiment of the present invention.

FIG. 4 illustrates voice packet transmission through a packet network according to an embodiment of the present invention.

Referring to FIG. 4, after being processed by an encoder 402, a bitstream of a voice signal 401 must be converted into a packet in a format appropriate for transmission before being transmitted to a receiving end through a packet network 404. Specifically, a real-time transport protocol (RTP) 403 divides a bitstream output from the encoder 402 into a plurality of packets and transmits the packets to the receiving end through the packet network 404. Then, the packets received by the receiving end are stored in a jitter buffer 406. Therefore, the deterioration of sound quality caused by a delayed arrival of the packets or the packets received in a sequence different from a sequence in which the packets were originally transmitted can be reduced. A decoder 407 processes outputs of the jitter buffer 406 at regular intervals and outputs a voice signal 408.

A jitter is the distribution of arrival time intervals of packets and exists in a packet-based network. If a phone using the VoIP service has a jitter, a receiver cannot reproduce some of packets which arrive late. Since the packets that arrive late cannot be reproduced, call quality may deteriorate. A jitter buffer is used in order to prevent such a jitter. Here, the jitter buffer is classified into a static jitter buffer and a dynamic jitter buffer.

An embedded codec includes a plurality of layers, and each layer is formed in an embedded manner. A layer that is most essential to the reproduction of a voice signal is called a core layer. Once the core layer is available, a receiving end can basically reproduce the voice signal. In addition, as the number of layers increases, sound quality is enhanced or bandwidth widens. Since each layer is formed in an embedded manner, decoding a bitstream up to, for example, layer 3, requires bitstreams of lower layers (layers 1 and 2). The higher layer denotes the more increased bit rate. A bit rate provided by a layer may vary according to a codec. In the case of the embedded codec being standardized by the ITU-T Q10, layer 2 provides 4 kbit/s, and the bit rate is increased by 2 kbit/s from layer 3. Hence, the embedded codec supports 12 layers providing up to 32 kbit/s.

The embedded codec may convert bitstreams of all layers into a packet or a plurality of packets and transmit the packet or packets. For example, the core layer may be converted into a packet, and every two of the remaining layers may be converted into a packet for transmission. In this case, since the core layer plays the most important role in the reproduction of a voice signal, the packet of the core layer is transmitted to a good network, and the remaining packets are transmitted to other networks, thereby saving the costs required to transmit the entire packets.

When an output stream of the embedded codec is divided into a plurality of packets and transmitted accordingly, the packets may be transmitted through a path or different paths. In addition, the time and sequence of reception of each packet may be different, which needs to be taken into consideration.

Figure 5:
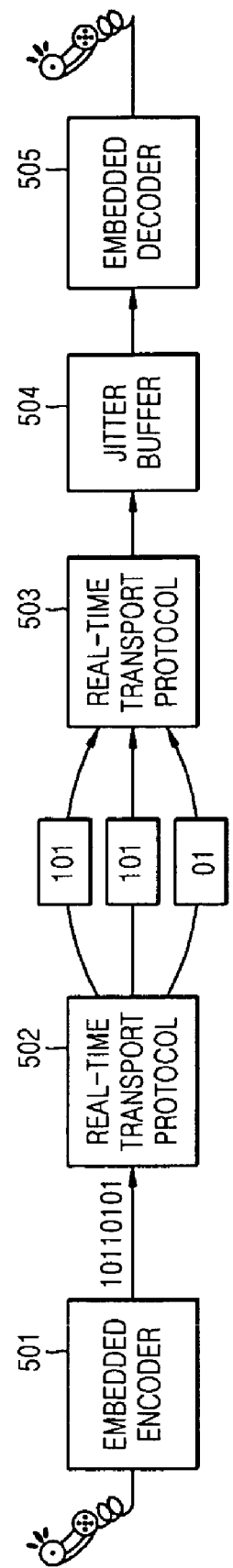
FIG. 5 illustrates the flow of packets of an embedded codec, which are transmitted through different paths, according to an embodiment of the present invention.

FIG. 5 illustrates the flow of packets of an embedded codec, which are transmitted through different paths, according to an embodiment of the present invention.

Since each packet is transmitted using a different path, a receiving end must exactly know the position of each packet. In other words, the receiving end can decode a voice signal only when it knows which portion of a bitstream output from an encoder has been transmitted in which packet. Decoding is performed at time intervals determined according to the size of a jitter buffer. However, there is no guarantee that all packets will always arrive before information needs to be transmitted to a decoder. For example, it is assumed that an output stream of an embedded codec have been divided into three packets p0, p1 and p2 and transmitted accordingly at a time t. The packets p0, p1 and p2 may have been transmitted using a path or three different paths.

It is also assumed that the packets p0 and p1 were received at a time (t+2) and that the packet p2 was received at a time (t+7). For example, if decoding has to be performed at a time (t+5), better sound quality can be provided when a bitstream of a new bit rate is generated using the packets p0 and p1 and decoded than when no decoding is performed by processing the packet p2 as a lost packet since it has not been received yet.

Referring to FIG. 5, if a bitstream of a voice signal output from an encoder 501 is 10110101, an RTP 502 divides the beam stream 10110101 into packets 101, 101, and 01. Even if the packets 101, 101 and 01 are transmitted using different paths, a receiving end can identify position information of each of the packets 101, 101 and 01 and store the packets 101, 101 and 01 in a jitter buffer 504. A bitstream is generated using the packets 101, 101 and 01 and based on the identified position information, and is restored to the original voice signal by a decoder 505.

Figure 6:
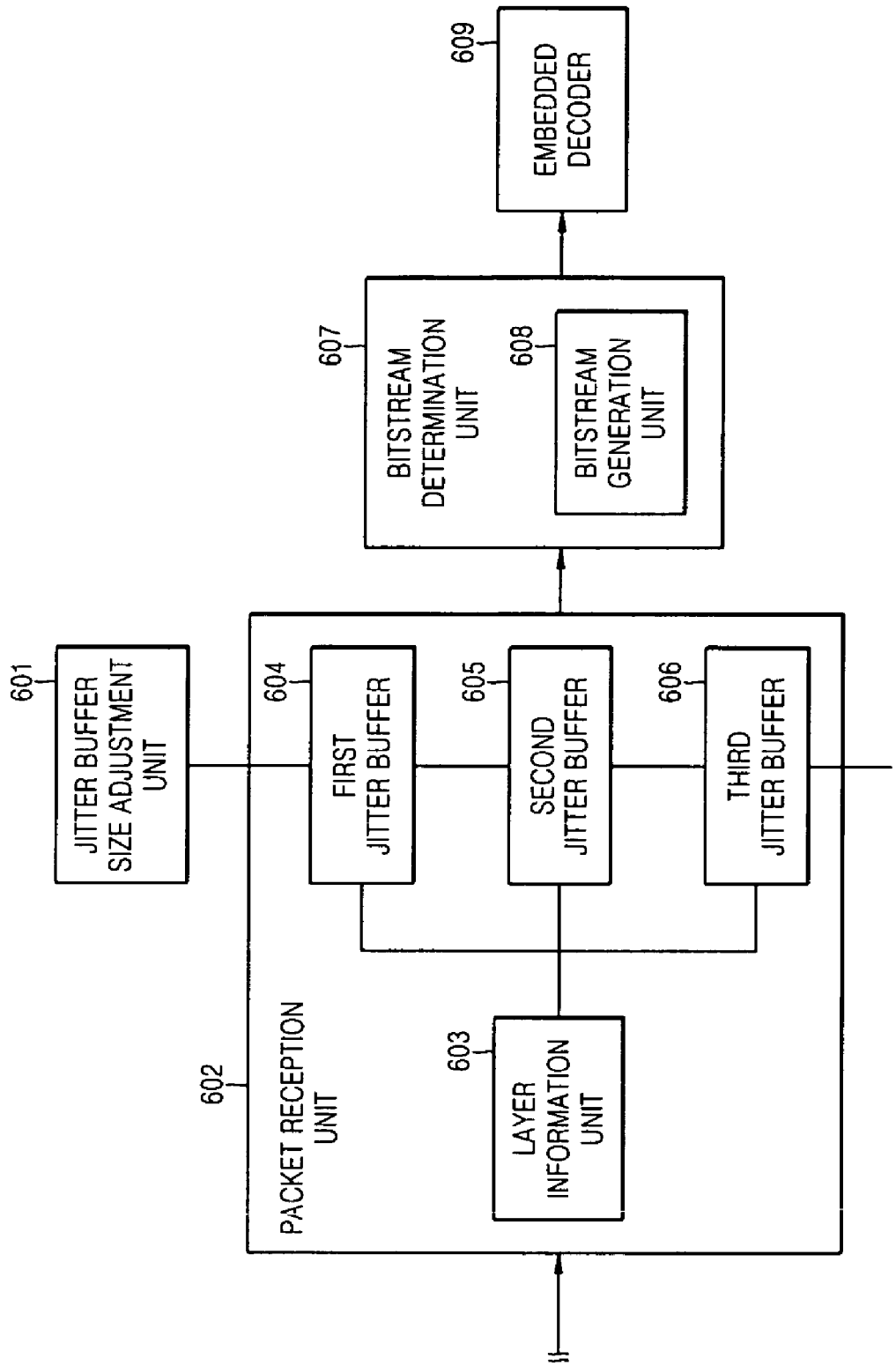
FIG. 6 is a block diagram of an apparatus for processing packets of an embedded codec according to an embodiment of the present invention.

FIG. 6 is a block diagram of an apparatus for processing packets of an embedded codec according to an embodiment of the present invention.

Specifically, FIG. 6 is an exemplary diagram for explaining a packet processing method which can minimize the deterioration of sound quality which may occur when an output bitstream of an embedded codec suggested in the present invention is divided into a plurality of packets and transmitted accordingly.

Since a bitstream of an embedded codec is formed in an embedded manner, a voice signal can be reproduced if a bitstream of the core layer is available. If bitstreams of the other layers are added, a bit rate is increased, but sound quality is enhanced and bandwidth widens. When a service is provided using this embedded codec, a different bit rate can be applied to each subscriber. Therefore, services of various qualities can be provided. For example, the embedded codec being standardized by Q10 includes a total of 12 layers. The core layer (G.729) provides 8 kbit/s. Layer 2 provides a bit rate of 12 kbit/s, which is increased by 4 kbit/s from 8 kbit/s, and provides better narrowband sound quality than the conventional G.729 narrowband codec. From layer 3, the bit rate is increased by 2 kbit/s as the level of layer is increased by one. Therefore, the embedded codec supports 12 layers providing up to 32 kbit/s. If a service is provided using the embedded codec at a bit rate of 24 kbit/s, bitstreams of eight layers including the core layer must be transmitted. The bitstreams of the eight layers may be divided into three packets and transmitted accordingly. For example, a bitstream of the core layer may be transmitted as a packet p0, bitstreams of layers 2, 3 and 4 may be transmitted as a packet 01, and bitstreams of layers 5, 6, 7 and 8 may be transmitted as a packet 2.

In this case, a receiving end must know the position of each of the packets p0, p1 and p2 in the 24 kbit/s bitstream based on received packets in order to generate a proper bitstream that is to be transmitted to an embedded decoder 609. A layer information unit 603 identifies the position of each received packet, concerning layers. In a method of identifying the position of each packet, the packets p0, p1 and p2 are transmitted through different paths, and the receiving end knows, in advance, information regarding which packet has been transmitted using which path and identifies the position of each of the packets p0, p1 and p2 based on the information. The receiving ends receive the layer information of the packets according to paths through which the packets are received.

In another method of identifying the position of each packet, when each of the packets p0, p1 and p2 packet is transmitted, information regarding the position of each of the packets p0, p1 and p2 is included in an RTP header and transmitted accordingly. Then, the receiving end identifies position information of each of the packets p0, p1 and p2 based on header information.

Once the position information of each of the packets p0, p1 and p2 is identified, the packets p0, p1 and p2 are stored in first through third jitter buffers 604, 605 and 606, respectively. The packets p0, p1 and p2 may be stored in one jitter buffer. However, it is easier to manage the packets p0, p1 and p2 when they are stored in different jitter buffers, respectively. In this example, the packet p0 is stored in the first jitter buffer 604, the packet p1 is stored in the second jitter buffer 605, and the packet p2 is stored in the third jitter buffer 606. In addition, when a jitter buffer size adjustment unit 601 adjusts the size of an adaptive jitter buffer, it uses transmission information of the packet p0.

In order to reproduce a voice signal, the receiving end transmits a bitstream stored in a jitter buffer to the embedded decoder 609 at regular intervals so that the embedded decoder 609 can decode the bitstream. If all packets, i.e., the packets p0, p1 and p2, have arrived at the receiving end, there would not be a problem. However, if only the packets p0 and p1 or the packets p0 and p2 have arrived, the bitstream cannot be decoded at a bit rate of 24 kbit/s, but at a bit rate of 16 kbit/s or 8 kbit/s. In this way, if a core codec is available, a bitstream generation unit 608 can perform a basic decoding operation even when not all packets have been received. In addition, if packets of two successive upper layers have arrived at the receiving end, up to the packets of the two successive layers can be decoded.

If the packets p0 and p2 are received, only the packet p0 can be decoded. If the packets p1 and p2 are received, they are processed as lost packets since no decoding operation can be performed. In this way, when an embedded codec divides a bitstream into a plurality of packets and transmits the packets accordingly, if a receiving end receives a packet of the core layer, it generates a bitstream using information regarding received packets, particularly, the packet of the core layer. Since the receiving end does not process the packets not received as lost packets, the deterioration of sound quality can be reduced.

If all packets have been received, a bitstream determination unit 607 forms the bitstream as it was initially transmitted using information transmitted from a jitter buffer. The bitstream generated by the bitstream determination unit 607 or the bitstream generation unit 608 is decoded and converted by the embedded decoder 609 into an initial signal.

Figure 7:
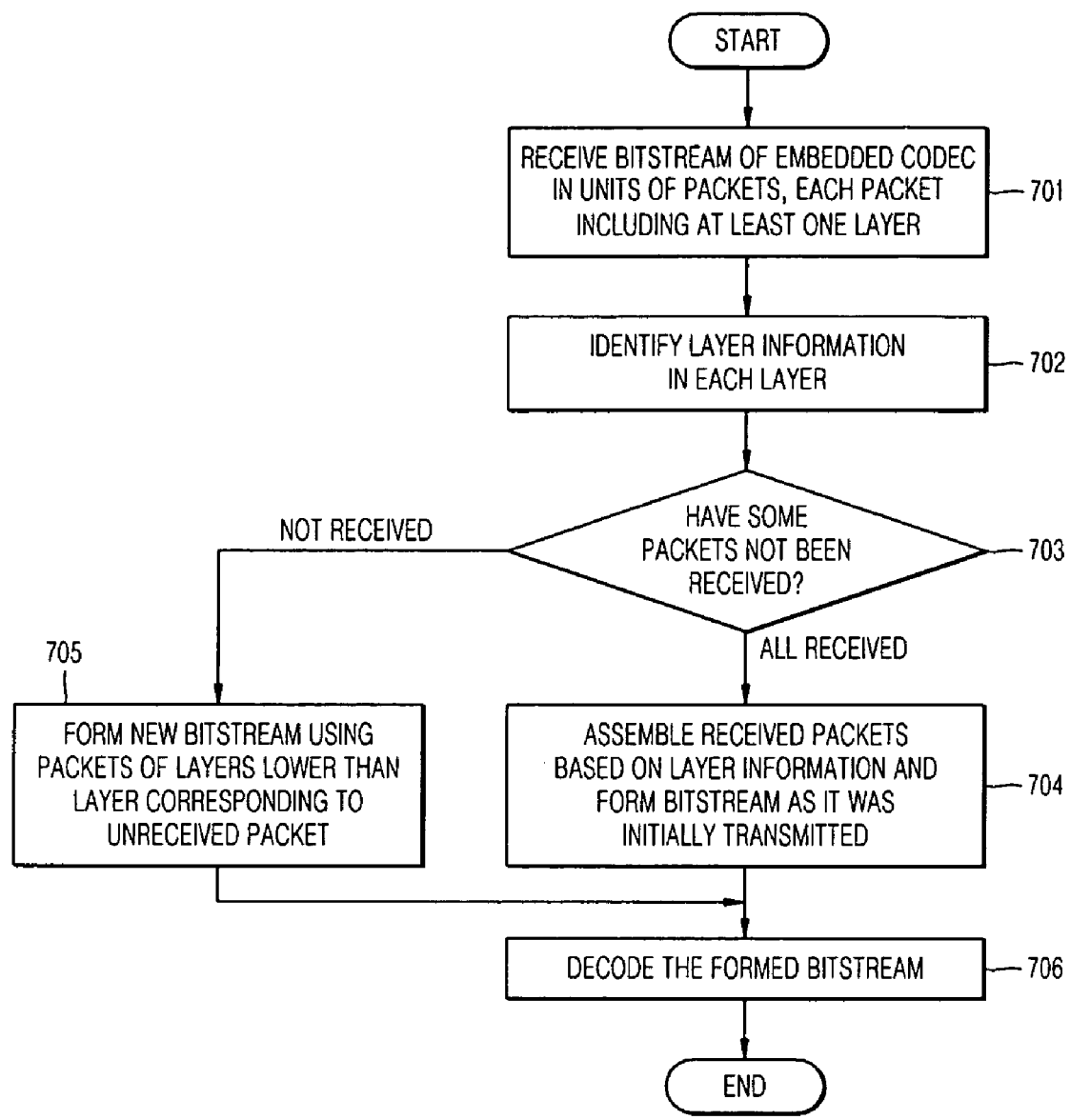
FIG. 7 is a flowchart illustrating a method of processing packets of an embedded codec according to an embodiment of the present invention.

FIG. 7 is a flowchart illustrating a method of processing packets of an embedded codec according to an embodiment of the present invention.

Referring to FIG. 7, a bitstream of an embedded codec is received in units of packets, each packet including at least one layer (operation 701). Information of which layer is included in each packet is identified (operation 702). It is determined whether some of the packets have not been received and lost (operation 703). If no packet has been lost, the packets are assembled using the identified layer information, and the bitstream as it was initially transmitted is formed (operation 704). If a packet has not been received, a new bitstream is formed using the packets of layers lower than a layer corresponding to the unreceived packet (operation 705). Finally, the new bitstream is decoded (operation 706).

As described above, according to the present invention, when an output bitstream of an embedded codec is divided into a plurality of packets and transmitted accordingly in order to provide a voice or multimedia service using the embedded codec in a packet network, even if not all packets are received, the position of each packet can be identified, and a decoding operation can be performed using received packets of successive upper layers including a packet of a core layer. Since packets are not processed as lost packets even when not all packets are received, sound quality can be enhanced. In addition, the size of an adaptive jitter buffer can be effectively adjusted using packet information of the core layer, which is essential to the decoding operation.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the following claims, and all differences within the scope will be construed as being included in the present invention.

What is claimed is:

1. An apparatus for processing a bitstream of an embedded codec, wherein the bitstream is received in units of packets, the apparatus comprising:
    a packet reception unit receiving the bitstream of the embedded codec, wherein the embedded codec comprises a plurality of layers, and the bitstream is received in units of packets including the layers;
    a layer information unit identifying layer information from received packets;
    a bitstream determination unit assembling bitstreams of the received packets based on the identified layer information and forming the bitstream as initially transmitted;
    a bitstream generation unit wherein, if the packet reception unit has not received a packet including a layer, the bitstream generation unit assembles received packets of layers lower than the layer corresponding to the unreceived packet based on the identified layer information and generates a new bitstream; and
    a decoder decoding (i) the bitstream formed by the bitstream determination unit or (ii) the new bitstream generated by the bitstream generation unit;
    wherein the layer information unit identifies the layer information by receiving the layer information of the packets according to paths through which the packets are received.

2. The apparatus of claim 1, wherein which layer of the bitstream is to be included in each of the received packets is predetermined when the bitstream is initially transmitted.

3. The apparatus of claim 1, further comprising:
    a jitter buffer storing the bitstream received in units of packets; and
    a jitter buffer size adjustment unit adjusting the size of the jitter butter.

4. The apparatus of claim 3, wherein the packets, in units of which the bitstream is received, are stored in different jitter buffers, respectively.

5. The apparatus of claim 1, wherein
    if the unreceived packet is a packet of a core layer, the bitstream generation unit does not generate the new bitstream; and
    the core layer is a minimum unit layer for decoding.

6. The apparatus of claim 1, wherein the layer information unit identifies the layer information included in a real-time transport protocol (RTP) header of each of the packets.

7. A method of processing a bitstream of an embedded codec, wherein the bitstream is received in units of packets, the method comprising:
    receiving the bitstream of the embedded codec, wherein the embedded codec comprises a plurality of layers, and the bitstream is received in units of packets including the layers;
    identifying layer information from received packets, wherein the layer information is identified by receiving the layer information of the packets according to paths through which the packets are received;
    assembling bitstreams of the received packets based on the identified layer information and forming the bitstream as initially transmitted;
    if a packet including a layer has not been received, assembling received packets of layers lower than the layer corresponding to the unreceived packet based on the identified layer information and generating a new bitstream; and
    decoding (i) the bitstream formed in the forming of the bitstream or (ii) the new bitstream generated in the generating of the new bitstream.

8. The method of claim 7, wherein which layer of the bitstream is to be included in each of the received packets is predetermined when the bitstream is initially transmitted.

9. The method of claim 7, wherein, in the receiving of the bitstream of the embedded codec, the received packets are stored in a jitter buffer, and wherein the jitter buffer has an adjustable size.

10. The method of claim 9, wherein the packets, in units of which the bitstream is received, are stored in different jitter buffers, respectively.

11. The method of claim 7, wherein, if the unreceived packet is a packet of a core layer, the new bitstream is not generated, and wherein the core layer is a minimum unit layer for decoding.

12. The method of claim 7, wherein, in the identifying of the layer information, the layer information included in an RTP header of each of the packets is identified.

13. A non-transitory computer-readable recording medium containing thereon computer-readable code which, when executed by a computer, causes the computer to perform the method of claim 7.

* * * * *